July 11, 1950  G. A. DORNIN, JR  2,514,850
INGOT MOLD AND STOOL
Filed June 22, 1948  6 Sheets-Sheet 1
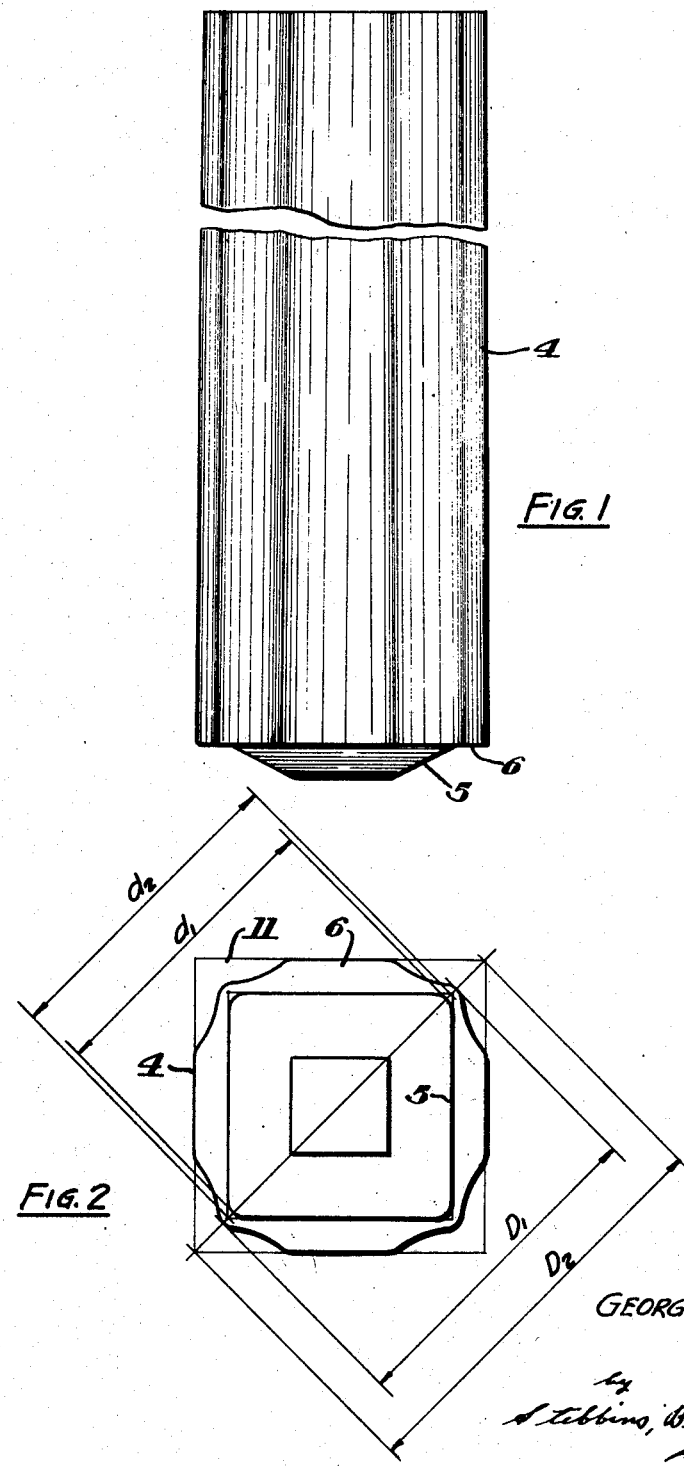
GEORGE A. DORNIN, JR.
INVENTOR.

July 11, 1950  G. A. DORNIN, JR  2,514,850
INGOT MOLD AND STOOL
Filed June 22, 1948  6 Sheets-Sheet 2
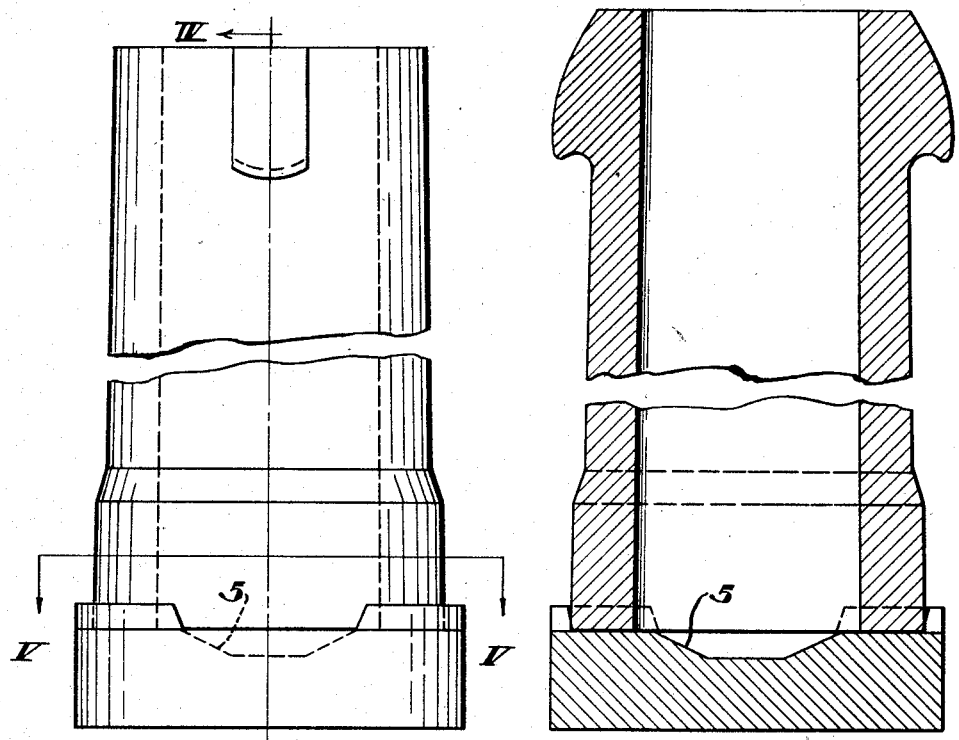
FIG. 3
FIG. 4
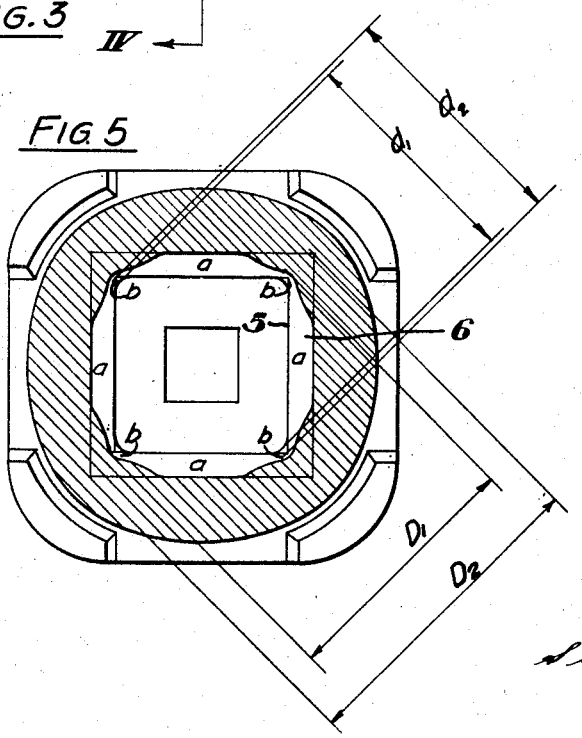
FIG. 5
GEORGE A. DORNIN, JR.
INVENTOR.

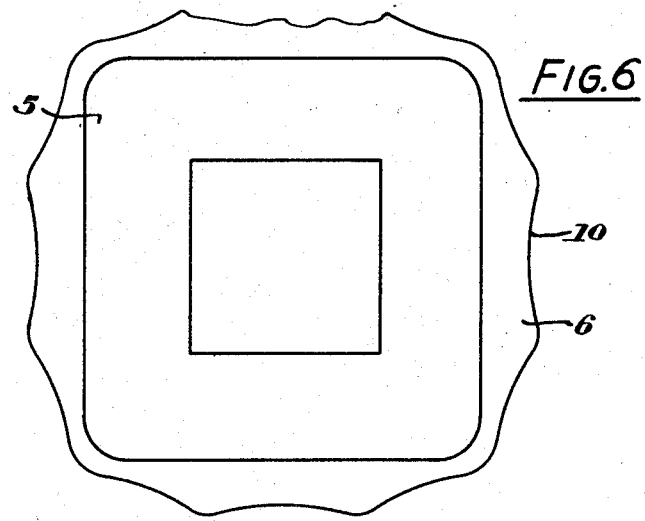
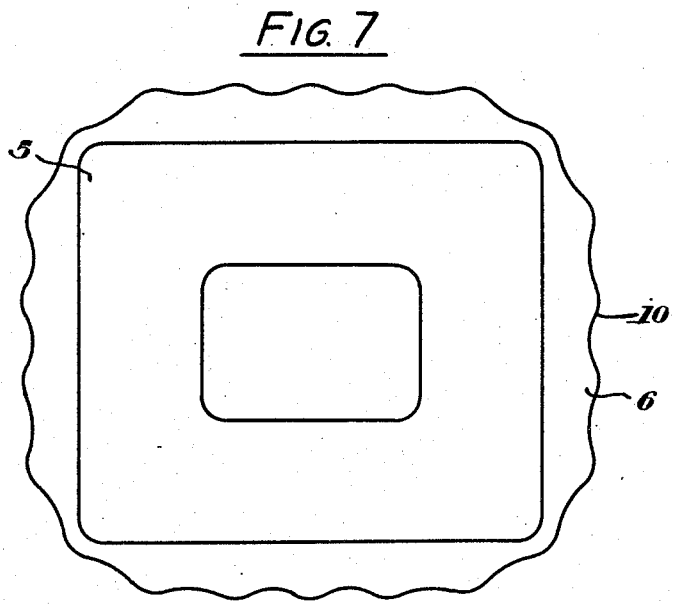

July 11, 1950     G. A. DORNIN, JR     2,514,850
INGOT MOLD AND STOOL

Filed June 22, 1948     6 Sheets-Sheet 4

GEORGE A. DORNIN, JR.
INVENTOR.

July 11, 1950   G. A. DORNIN, JR   2,514,850
INGOT MOLD AND STOOL
Filed June 22, 1948   6 Sheets-Sheet 5
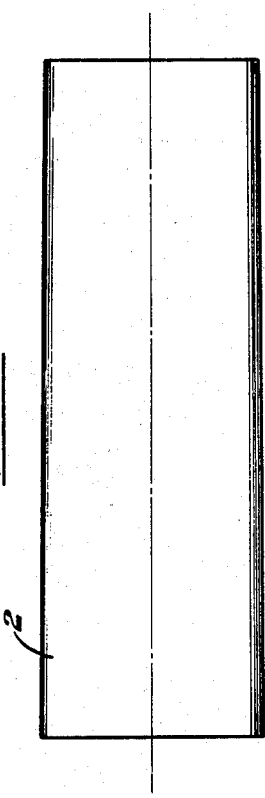
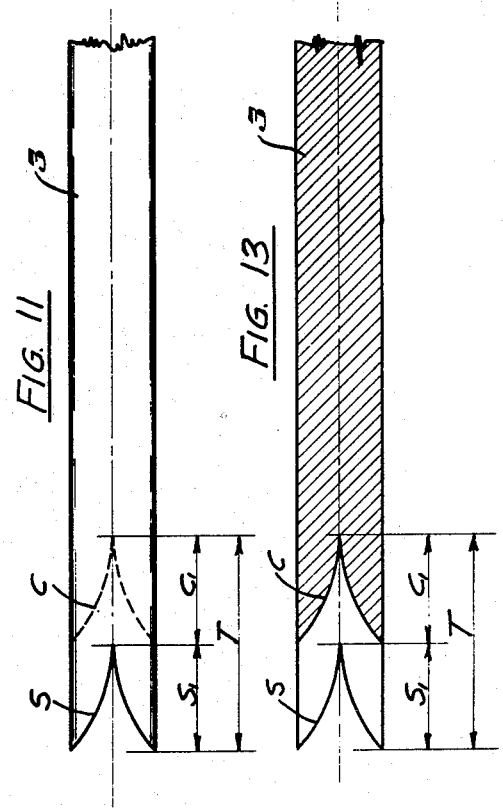
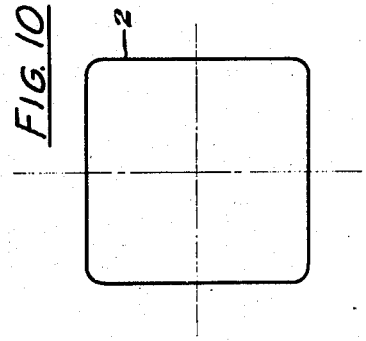
GEORGE A. DORNIN, JR.
INVENTOR.

July 11, 1950 G. A. DORNIN, JR 2,514,850
INGOT MOLD AND STOOL
Filed June 22, 1948 6 Sheets-Sheet 6
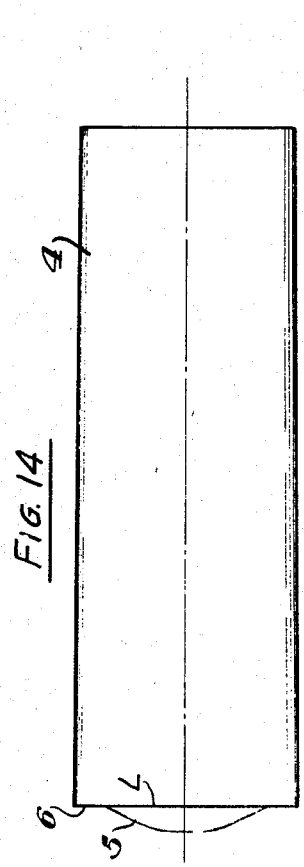
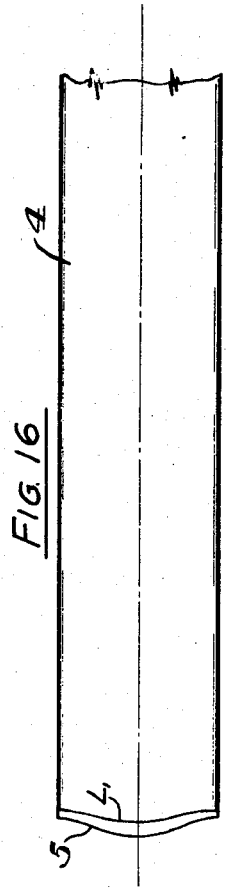
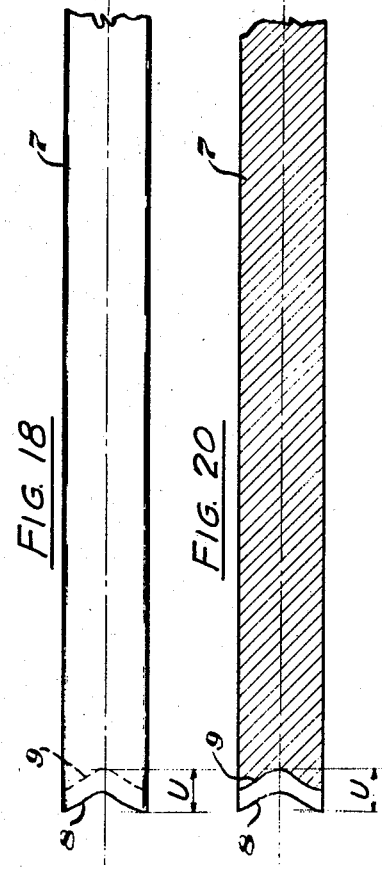
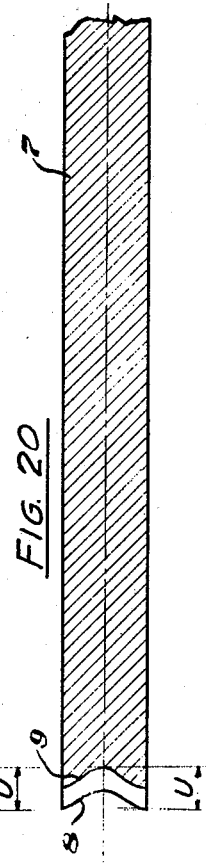
FIG. 14  FIG. 16  FIG. 18  FIG. 20
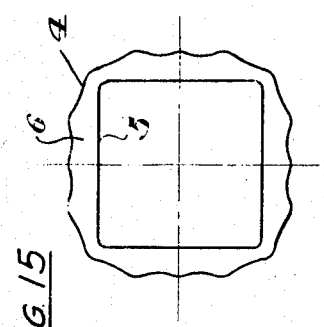
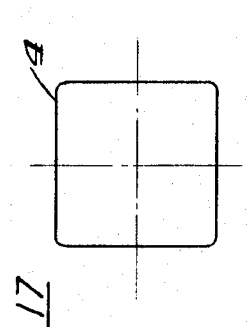
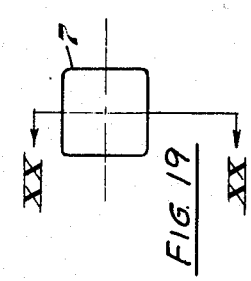
FIG. 15  FIG. 17  FIG. 19
GEORGE A. DORNIN, JR.
INVENTOR.
by Stebbins, Blenko & Webb
Attys.

Patented July 11, 1950

2,514,850

UNITED STATES PATENT OFFICE 2,514,850

INGOT MOLD AND STOOL

George A. Dornin, Jr., Warren, Ohio

Application June 22, 1948, Serial No. 34,431

6 Claims. (Cl. 22—139)

This invention relates to an ingot of special configuration whereby the amount of bottom croppage is materially reduced, and to an ingot mold and stool for forming said ingot. The invention is limited to ingots poured in open-bottom molds; that is, ingots whose bottom surfaces are formed against stools. The molds will usually be of the big-end-down type but may be big-end-up if desired.

Such ingots of the prior art have generally been poured on flat stools and thus have had flat bottoms, substantially normal to the axis of the ingot. It is known that the bottom end of such an ingot "fish-tails" when rolled to reduce its section and elongate it. The butt crop necessary because of this fish-tail constitutes a considerable loss, usually from about three to six per cent of the weight of the rolled bloom.

Therefore certain attempts have been made to shape the bottom of such ingots to overcome this fish-tail and thus reduce the bottom crop. The most obvious device has arisen from the observation that an ingot poured on an old stool, whose central portion had been made somewhat concave by the erosive action of numerous previously poured ingots, would fish-tail slightly less than an ingot poured on a new flat stool. This has led to the attempt to reduce the bottom crop by designing the stool with a concave depression on its top surface, thus approximately duplicating in a new stool the shape produced by wear in an old stool. Such attempts have resulted in little improvement over the normal practice of using flat stools and have thus usually been abondoned after a small experimental tonnage has been made.

A more successful attempt to reduce the amount of bottom crop is the method proposed by George A. Dornin in Patent No. 2,282,462, granted May 12, 1942. In this patent Dornin recognized the necessity of not only reducing fish-tail but also the necessity of preventing the fin or corner at the mold-stool juncture from rolling up on the surface of the bloom and thus producing scabs which might necessitate an even larger crop than the fish-tail resulting from flat stools. Dornin proposed to attain these desired ends by the use of a critical angle between the convex bottom of the ingot adjacent its sides and a plane normal to the axis of the ingot. He pointed out that too small an angle would result in excessive fish-tail and too large an angle would result in a tendency for the fin or corner of the ingot at the mold-stool juncture to roll up on the side of the bloom, thus producing scabs on the bloom's surface which would result in excessive bottom crop.

The Dornin patent discloses the use of a fitting surface between mold and stool which is not a plane surface. The fitting surface can be curved or can be composed of a number of flat planes, some of which are inclined to the horizontal. Since, with such a fitting surface, it is difficult to maintain a good fit between molds and stools, the use of Dornin's invention has been greatly curtailed and its effectiveness considerably reduced.

My invention overcomes this objectionable feature of the Dornin patent and yet makes possible a material reduction in the amount of bottom crop as compared with conventional flat bottom ingots, with ingots poured on old worn stools or with ingots poured on stools which have been designed to approximate the effect of wear.

The essential features of my invention are:

1. The fitting surface between mold and stool shall be a plane.
2. The transverse contour of the ingot adjacent its lower end (or the lower portion of the mold cavity) shall have a "factor of rectangularity," as hereinafter defined between 78 and 88%.
3. The portion of the stool under the mold cavity shall have a central concave depression in its top surface, said depression being smaller in plan view and more nearly rectangular than the mold cavity.

The accompanying drawings illustrate several embodiments of my invention.

Figure 1 is a side elevation of an ingot according to my invention;

Figure 2 is a bottom view of the ingot shown in Figure 1;

Figure 3 is a side elevation of the mold and stool used to form the ingot shown in Figures 1 and 2;

Figure 4 is a longitudinal section taken on the line IV—IV of Figure 3;

Figure 5 is a transverse section taken on the line V—V of Figure 3;

Figures 6 and 7 are bottom views of other ingots according to my invention;

Figure 9 is a side elevation of a conventional rectangular, flat-bottom ingot;

Figure 10 is a bottom view of the ingot of Figure 9;

Figure 11 is a side elevation of the bloom rolled from the ingot of Figures 9 and 10;

Figure 12 is an end view of the bloom of Figure 11;

Figure 13 is a longitudinal section taken on the line XIII—XIII of Figure 12;

Figure 14 is a side elevation of an ingot according to one embodiment of my invention;

Figure 15 is a bottom view of the ingot of Figure 14;

Figure 16 is a side elevation of the ingot of Figures 14 and 15 after several passes through the mill;

Figure 17 is a bottom view of the partially rolled ingot of Figure 16;

Figure 18 is a side elevation of the finished bloom rolled from the ingot of Figures 14 and 15;

Figure 19 is a bottom view of the bloom of Figure 18;

Figure 20 is a longitudinal section taken on the line XX—XX of Figure 19.

Figure 8:
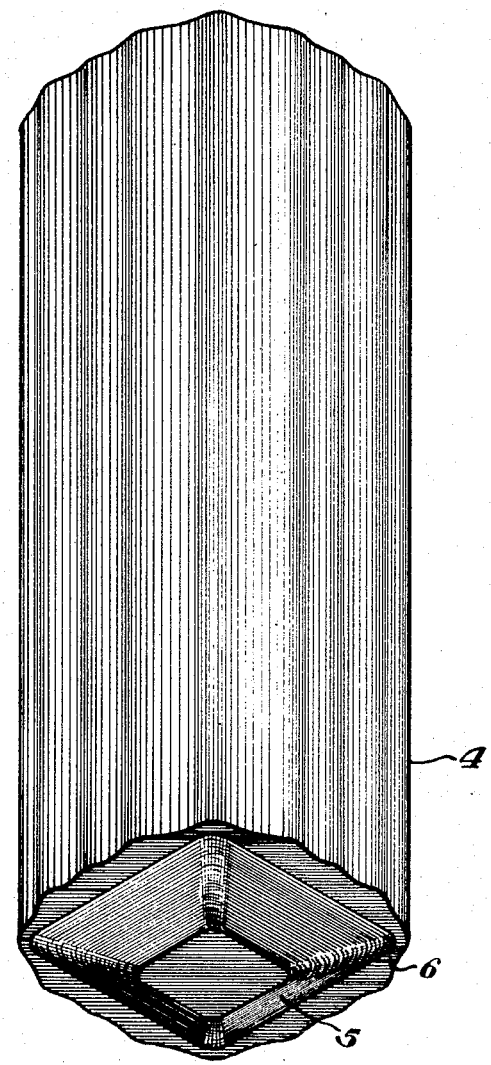
Figure 8 is a perspective view of an ingot according to my invention.

When a flat-bottom rectangular ingot is rolled between cylindrical rolls and reduced in both width and thickness the resulting fish-tail has two components, that which takes place on the surface and that which takes place at the center line. This is caused by the fact that the four corners are worked by the rolls on all passes and thus fish-tail on all passes. The resulting total depth of fish-tail is the sum of the surface fish-tail and the center line fish-tail. Figures 9 through 13 illustrate this. Figures 9 and 10 represent the ingot 2 as poured while Figures 11 through 13 illustrate the resulting rolled bloom 3. In Figures 11 and 13 the surface fish-tail is designated by the reference letter S and the bottom crop necessitated by it is designated by the reference letter $S_1$. The centerline fish-tail is designated by the reference letter C and the bottom crop ncessitated by it is designated by the reference letter $C_1$. The resulting total depth of fish-tail and the bottom crop required is designated by the reference letter T and is approximately the sum of $S_1$ and $C_1$.

I have found that if the ingot is made according to my invention I can retain the simplicity of a plane fitting surface between mold and stool and still greatly reduce both the center-line fish-tail and the surface fish-tail. With the novel bottom shape I propose the border at the mold-stool juncture, which is cast in a flat plane, rolls into a compound curve during the first few passes through the mill. The desired end is achieved, however, without the obvious drawback of a non-planar mold-stool fitting surface.

This is illustrated in Figures 14 through 20. Figures 14 and 15 represent an ingot according to one embodiment of my invention. The ingot 4 has a central convex projection 5 at its bottom surrounded by a flat border 6, all portions of which lie in the same plane substantially normal to the axis of the ingot. Figures 16 and 17 show the ingot of Figures 14 and 15 after several passes through the mill. It will be noted that the straight line L in Figure 14, which designates the edge of the border 6, which border is formed by the plane fitting surface of the mold and stool used to cast the ingot, is changed by the action of the rolls during the first few passes through the mill to the convex curved line $L_1$, in Figure 16. Thus, by the time the ingot is "squared-up" by these early passes the bottom is rolled into a shape of compound convexity, as shown in Figure 16. This is the shape required to resist the tendency of the mill to produce both surface and centerline fish-tail during subsequent rolling to finished bloom size.

Figures 18 through 20 show the finished bloom 7. Because of the shape assumed by the bottom of the ingot during the early stages of rolling, shown in Figure 16, both the surface fish-tail 8 and the centerline fish-tail 9 have been held to a minimum and the necessary bottom crop, designated by the reference letter U, is very much smaller than that required in the case of the bloom rolled from the conventional rectangular flat-bottom ingot.

The ratio of the diagonal dimension of any geometric figure (such, for example, as might be used as the transverse contour of an ingot or mold cavity) to the diagonal dimension of the smallest rectangle that can be circumscribed about that figure, gives a convenient measure of the "rectangularity" of the contour in question. This ratio, sometimes hereafter referred to as the "factor of rectangularity" of the contour is herein defined as the ratio of the length of the diagonal of the contour in question to the length of the diagonal of the smallest rectangle that can be circumscribed about said contour. Thus the factor of rectangularity of the transverse contour of the ingot of Figure 2 is $D_1/D_2$. Likewise the factor of rectangularity of the plan view of the central convex projection 5 of the bottom of the ingot of Figure 2 is $d_1/d_2$. Referring to Figure 5, the factor of rectangularity of transverse contour of the mold cavity is $D_1/D_2$ and the factor of rectangularity of the plan view of the stool depression is $d_1/d_2$.

Referring again to Figure 2, it will be seen that the diagonal dimension of the transverse contour of the ingot at its bottom, designated by the reference $D_1$, is considerably less than the diagonal dimension of the rectangle circumscribed about the ingot contour, designated by reference $D_2$. Still referring to Figure 2, it will be seen that the diagonal dimension of the plan view of the central convex projection 5 of the bottom of the ingot, designated by reference $d_1$, is only slightly less than the diagonal dimension of the rectangle circumscribed about it, designated by reference $d_2$. It is an essential feature of my invention that the ratio of $d_1$ to $d_2$, be greater than the ratio of $D_1$ to $D_2$. Thus the plan view of the convex projection 5 of the bottom of the ingot is more nearly rectangular (i. e., has a greater factor of rectangularity) than the transverse bottom contour of the ingot.

Similarly, in Figure 5, which shows the mold and stool used to form the ingot of Figure 2, the ratio $d_1/d_2$ is greater than the ratio of $D_1/D_2$. Figures 6 and 7 show bottom views of various ingots according to my invention and Figure 8 is a perspective view of an ingot according to my invention. While these ingots have fully corrugated contours 10, these corrugations do not constitute an essential part of my invention. They are shown as examples of possible constructions. While corrugations in the sides of ingots are generally thought to improve the surface of the rolled product, I have found that the removal of the corner metal, as indicated by the reference numeral 11 in Figure 2, is, in itself, a more effective means of achieving this desired end. It is my experience that when the transverse contour of an ingot embodies both of these features the best surface will result. However, from the standpoint of accomplishing the principal object of my invention (reducing the bottom crop) the ingot shown in Figure 2 will be as effective as any of the ingots shown in Figures 6 through 8.

For the best results I have found that the factor of rectangularity of the transverse contour of the ingot adjacent the lower end (or the transverse contour of the lower portion of the mold cavity) should be greater than 78 per cent and less than 88 per cent and preferably between 80 per cent and 86 per cent. The central convex projection 5 on the bottom of the ingot (or the plan view of the stool depression) should, in all cases, have a greater factor of rectangularity than that of the transverse ingot contour. For best results the ratio $d_1/d_2$ should be at least 5 per cent and preferably at least 10 per cent greater than the ratio $D_1/D_2$. (See Figures 2 and 5.)

If the ratio $D_1/D_2$, in Figures 2 and 5, is greater than 88 per cent the surface fish-tail will be too great and a correspondingly large bottom crop will be necessary. If, on the other hand, the ratio $D_1/D_2$ is less than 78 per cent there may be an over-correction for surface fish-tail, resulting in the four corners of the ingot working up on to the sides of the bloom during rolling. The scabs resulting from this corner roll-up will necessitate an unduly large bottom crop. However, if the ratio $D_1/D_2$ is greater than 78 per cent and less than 88 per cent and the ratio $d_1/d_2$ is greater than the ratio $D_1/D_2$ the surface fish-tail will be held to a minimum. At the same time the convexity of the projection 5 of the ingot will greatly reduce the tendency to fish-tail across the center lines of the bloom and a minimum bottom crop will result.

There will be some variation in the ideal $D_1/D_2$ ratio from plant to plant. Generally the smaller the ingot, the larger the roll diameter and the heavier the drafts during rolling the greater should be the $D_1/D_2$ ratio and the larger the ingot, the smaller the roll diameter and the lighter the drafts the smaller should be the $D_1/D_2$ ratio. Thus the ideal $D_1/D_2$ ratio for a given size ingot rolled on a very large mill with a small number of heavy passes would be somewhat larger than the ideal $D_1/D_2$ ratio for the same size ingot rolled on a small mill with a large number of very light passes. In no case, however, should the $D_1/D_2$ ratio be less than 78 per cent or greater than 88 per cent, in most cases the ideal ratio will be between 80 per cent and 86 per cent.

It will be noted that in the mold and stool made in accordance with my invention (see Figure 5) the width of the border 6 adjacent the center lines of the sides of the mold as designated by reference character $a$ is greater than the width of the border adjacent the corners of the mold as designated by the reference character $b$. This construction decreases the tendency of the ingot, when being rolled into a bloom, to form surface fish-tails and also decreases the tendency of scabs to roll up the surface of the bloom near the center lines of the sides of the bloom. My construction accomplishes results not attained in previous attempts to reduce bottom crop on ingots poured on concave stools with flat mold-stool fitting surfaces. For example, in a square ingot poured on a stool with a circular depression in its top surface the width of the border surrounding the depression is greater at the corners of the mold than at the middle of the sides of the mold. Such construction increases the tendency of the ingot, when being rolled into a bloom, to form surface fish-tails and also increases the tendency of scabs to roll up the surface of the bloom near the center lines of the sides of the bloom.

In pouring metal in an ingot mold against a stool there is always some erosion of the stool which changes the depth and contour of the depression originally formed in the stool. My construction in which the width of the border 6 is greater at the sides than at the corners of the mold is advantageous for the further reason that in such construction the effect of erosion on the stool is less serious than in the case of the previously referred to combination of a rectangular ingot and a stool having a circular depression in its top surface, and, in fact, is better than any combination of mold and stool in which the width of the border is greater at the corners than at the mid-portion of the sides of the mold.

The invention is not limited to the preferred embodiments, which have been given merely by way of example, but may be otherwise embodied or practiced within the scope of the following claims.

I claim:

1. Apparatus for casting ingots, comprising a flat-bottom ingot mold and an ingot mold stool, the transverse contour of the cavity of said ingot mold, adjacent its lower end, being generally rectangular but with fluted corners and having a factor of rectangularity of 78 to 88 per cent, the top surface of said ingot mold stool having a concave depression in its central portion which, in plan view, has a factor of rectangularity greater than that of said mold cavity, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

2. Apparatus for casting ingots, comprising a flat-bottom ingot mold and an ingot mold stool, the transverse contour of the cavity of said ingot mold, adjacent its lower end, being generally rectangular but with fluted corners and having a factor of rectangularity of 80 to 86 per cent, the top surface of said ingot mold stool having in its central portion a concave depression which, in plan view, has a factor of rectangularity greater than that of said mold cavity, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

3. Apparatus for casting ingots comprising a flat-bottom ingot mold and an ingot mold stool, the transverse contour of the cavity of said mold, adjacent its lower end, being generally rectangular but with fluted corners and having a factor of rectangularity of 78 to 88 per cent, the top surface of said stool having in its central portion a concave depression which, in plan view, has a factor of rectangularity at least five per cent greater than that of the mold cavity adjacent its lower end, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

4. Apparatus for casting ingots comprising a flat-bottom ingot mold and an ingot mold stool, the transverse contour of the cavity of said mold, adjacent its lower end, being generally rectangular but with fluted corners and having a factor of rectangularity of 80 to 86 per cent, the top surface of said stool having in its central portion a concave depression which, in plan view, has a factor of rectangularity at least five per cent greater than that of the mold cavity adjacent its lower end, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

5. Apparatus for casting ingots comprising a flat-bottom ingot mold and an ingot mold stool, the transverse contour of the cavity of said mold, adjacent its lower end, being generally rectangular but with fluted corners and having a factor of rectangularity of 78 to 88 per cent, the top surface of said stool having in its central portion a concave depression which, in plan view, has a factor of rectangularity at least ten per cent greater than that of the mold cavity adjacent its lower end, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

6. Apparatus for casting ingots comprising a flat-bottom ingot mold and an ingot mold stool, the transverse contour of the cavity of said mold, adjacent its lower end, being generally rectangular but with fluted corners and having a factor of rectangularity of 80 to 86 per cent, the top surface of said stool having in its central portion a concave depression which, in plan view, has a factor of rectangularity at least ten per cent greater than that of the mold cavity adjacent its lower end, said concave depression being surrounded by a flat border all portions of which lie in the same plane substantially normal to the axis of the ingot mold, the width of said border between the ingot mold cavity and said concave depression being greater at the sides of the ingot mold than at the corners of the ingot mold.

GEO. A. DORNIN, JR.

REFERENCES CITED

The following references are of record in the file of this patent:

UNITED STATES PATENTS

| Number | Name | Date |
| --- | --- | --- |
| 1,531,388 | Girdler | Mar. 31, 1925 |
| 1,665,275 | Perry | Apr. 10, 1928 |
| 1,720,857 | Perry | July 16, 1929 |
| 1,813,507 | Ramage | July 7, 1931 |
| 2,054,597 | Gathmann | Sept. 15, 1936 |
| 2,092,551 | Gathmann | Sept. 7, 1937 |
| 2,093,024 | Williams | Sept. 14, 1937 |
| 2,138,121 | Ramsey | Nov. 29, 1938 |
| 2,324,786 | Lindemuth | July 20, 1943 |
| 2,340,493 | Scully | Feb. 1, 1944 |